(12) United States Patent
Keefer et al.

(10) Patent No.: US 7,250,150 B1
(45) Date of Patent: Jul. 31, 2007

(54) CHEMICAL REACTOR WITH PRESSURE SWING ADSORPTION

(75) Inventors: Bowie G. Keefer, Galiano Island (CA); Denis J. Connor, West Vancouver (CA)

(73) Assignee: QuestAir Technology, Inc., Burnaby, British Columbia (CA)

( * ) Notice: Subject to any disclaimer, the term of this patent is extended or adjusted under 35 U.S.C. 154(b) by 1304 days.

(21) Appl. No.: 09/591,277

(22) Filed: Jun. 9, 2000

(30) Foreign Application Priority Data

Jun. 10, 1999 (CA) ..................................... 2274300
Jun. 10, 1999 (CA) ..................................... 2274301

(51) Int. Cl.
*C01B 3/22* (2006.01)
*C01B 3/24* (2006.01)
*C01B 3/26* (2006.01)
*C01B 21/02* (2006.01)
*C01C 1/04* (2006.01)
*C07C 2/00* (2006.01)
*C07C 27/26* (2006.01)

(52) U.S. Cl. ........................... 423/651; 95/116; 95/128; 95/130; 95/139; 95/140; 95/141; 95/143; 252/373; 423/351; 423/359; 423/418.2; 423/437.1; 423/648.1; 423/652; 423/653; 423/659; 518/722; 585/500; 585/700

(58) Field of Classification Search ................ 423/650, 423/651, 652, 659, 359, 418.2, 437.1, 653
See application file for complete search history.

(56) References Cited

U.S. PATENT DOCUMENTS 3,176,446 A 4/1965 Siggelin
3,231,492 A 1/1966 Stine et al.
4,224,299 A 9/1980 Barber et al.
4,273,743 A 6/1981 Barber et al.
4,354,859 A 10/1982 Keller et al.

(Continued)

FOREIGN PATENT DOCUMENTS

CA 1256038 6/1989

(Continued)

OTHER PUBLICATIONS

Chatsiriwech et al., *Catalysis Today* 20:351-366, 1994, no month.

(Continued)

*Primary Examiner*—Wayne A. Langel
(74) *Attorney, Agent, or Firm*—Klarquist Sparman, LLP

(57) ABSTRACT

A chemical reaction is performed with separation of the product(s) and reactant(s) by pressure swing adsorption (PSA), using an apparatus having a plurality of adsorbers cooperating with first and second valve assemblies in a PSA module. The PSA cycle is characterized by multiple intermediate pressure levels between higher and lower pressure of the PSA cycle. Gas flows enter or exit the PSA module at the intermediate pressure levels as well as the higher and lower pressure levels, entering from compressor stage(s) or exiting into exhauster or expander stages, under substantially steady conditions of flow and pressure. The PSA module comprises a rotor containing the adsorbers and rotating within a stator, with ported valve faces between the rotor and stator to control the timing of the flows entering or exiting the adsorbers in the rotor. The reaction may be performed within a portion of the rotor containing a catalyst.

15 Claims, 11 Drawing Sheets

U.S. PATENT DOCUMENTS

| | | | |
|---|---|---|---|
| 4,452,612 | A | 6/1984 | Mattia |
| 4,530,705 | A | 7/1985 | Firey |
| 4,537,760 | A | 8/1985 | Lavie |
| 4,702,903 | A | 10/1987 | Keefer |
| 4,731,387 | A | 3/1988 | Westerterp |
| 4,758,253 | A * | 7/1988 | Davidson et al. ............... 95/97 |
| 4,781,735 | A | 11/1988 | Tagawa |
| 4,801,308 | A | 1/1989 | Keefer |
| 4,816,121 | A | 3/1989 | Keefer |
| 4,946,479 | A | 8/1990 | Izumo |
| 4,968,329 | A | 11/1990 | Keefer |
| 4,969,935 | A | 11/1990 | Hay |
| 5,082,473 | A | 1/1992 | Keefer |
| 5,133,784 | A * | 7/1992 | Boudet et al. ................ 95/100 |
| 5,246,676 | A | 9/1993 | Hay |
| 5,248,325 | A | 9/1993 | Kagimoto et al. |
| 5,256,172 | A | 10/1993 | Keefer |
| 5,284,368 | A | 2/1994 | Oetiker et al. |
| 5,328,503 | A | 7/1994 | Kumar |
| 5,393,326 | A | 2/1995 | Engler |
| 5,411,578 | A | 5/1995 | Watson |
| 5,441,559 | A * | 8/1995 | Petit et al. .................... 96/125 |
| 5,449,696 | A | 9/1995 | Dandekar et al. |
| 5,487,775 | A | 1/1996 | LaCava et al. |
| 5,523,326 | A | 6/1996 | Dandekar et al. |
| 5,656,067 | A | 8/1997 | Watson et al. |
| 5,658,370 | A | 8/1997 | Vigor et al. |
| 5,711,926 | A | 1/1998 | Knaebel |
| 5,827,496 | A | 10/1998 | Lyon |
| 6,051,050 | A | 4/2000 | Keefer et al. |
| 6,056,804 | A | 5/2000 | Keefer et al. |
| 6,063,161 | A | 5/2000 | Keefer et al. |
| 6,176,897 | B1 | 1/2001 | Keefer |
| 6,406,523 | B1 * | 6/2002 | Connor et al. ................ 96/125 |
| 6,514,319 | B2 * | 2/2003 | Keefer et al. ................ 95/101 |

FOREIGN PATENT DOCUMENTS

| | | |
|---|---|---|
| CA | 2016045 | 8/1994 |
| CA | 2109055 | 2/1999 |
| CA | 2087972 | 1/2000 |
| CA | 2087973 | 1/2001 |
| EP | 0 143 537 | 3/1990 |
| EP | 0 681 860 A2 | 11/1995 |
| EP | 0 681 860 A3 | 11/1995 |
| WO | WO 94/04249 | 8/1992 |
| WO | WO 99/28013 | 6/1999 |
| WO | WO 00/76629 | 12/2000 |

OTHER PUBLICATIONS

Vaporciyan et al., *AIChE Journal* 35(5):831-844, 1989, no month.

* cited by examiner

CHEMICAL REACTOR WITH PRESSURE SWING ADSORPTION

FIELD OF THE INVENTION

The invention relates to chemical reactions conducted in the gas or vapour phase. Reactions may be exothermic or endothermic, and may be conducted over a catalyst or under an appropriate form of external excitation to stimulate the reaction. Some particular applications include ammonia synthesis, methanol synthesis, conversion of natural gas or syngas to liquid fuels, hydrogenation and dehydrogenation reactions, and controlled oxidation reactions.

BACKGROUND OF THE INVENTION

Fundamental problems in the chemical process industry include management of reaction equilibrium and kinetics to achieve high conversion with desired selectivity under moderate reaction conditions, and management of the heat of reaction to control reaction temperature and to achieve high energy efficiency.

Typically, single pass conversion of the feed reactant(s) is incomplete because of equilibrium limitations. It is then often necessary to provide a separation system to extract useful products from the reactor effluent, and then to recycle unconsumed reactants to the reactor inlet. The prior art provides known separation processes based on condensation, distillation, membrane permeation, absorption, and adsorption. In most cases, these prior art separation processes are incompatible with the operating temperature of the reaction itself. Most conventional separation processes operate at ambient or sub-ambient temperature, while the reaction operates at elevated temperature so that costly heat exchangers are required for the recycle loop.

High temperatures generally promote good reaction rates, but shift the equilibrium of exothermic reactions toward lower conversion. The high cost of heat exchangers, recycle compressors, and other auxiliary equipment then incentivizes operation at relatively severe pressure or temperature reaction conditions to minimize the need for recycle. In the typical exothermic reaction example of ammonia synthesis, satisfactory conversion is achieved by forcing the equilibrium with high pressure operation, while product separation from the recycle loop is achieved by condensation usually after refrigeration.

Important applications exist where the separation of carbon dioxide is desired at elevated temperature from a reactive gas mixture containing steam, or where such separation could greatly enhance process efficiency, simplicity and economics. An important example is hydrogen production by steam reforming of natural gas. Several prior art processes have proposed sorption to remove carbon dioxide from reacting mixtures of steam and methane in order to drive the steam reforming and water gas shift reaction equilibria in order to produce moderately pure hydrogen at high conversion. Use of lime as a thermally regenerated sorbent in a fluidized bed reactor was proposed by Brun-Tsekhovoi et al, "The Process of Catalytic Steam-Reforming of Hydrocarbons in the Presence of carbon Dioxide Acceptor", *Hydrogen Energy Progress VII, Proceedings of the World Hydrogen Energy Conference*, Pergamon Press, p. 885 (1988). More recently, fixed bed pressure swing adsorption reactor processes for steam methane reforming have been developed by Gaffney et al (U.S. Pat. No. 5,917,136) using modified alumina adsorbents, and by J. R. Hufton, S. G. Mayorga and S. Sircar ("Sorption Enhanced Reaction Process for Hydrogen Production", AIChEJ 45, 248 (1999)) using mixed metal oxides derived from hydrotalcite and promoted with potassium carbonate.

Gas separation by pressure swing adsorption (PSA) is achieved by coordinated pressure cycling and flow reversals over an adsorbent bed which preferentially adsorbs a more readily adsorbed component relative to a less readily adsorbed component of the mixture. The total pressure is elevated during intervals of flow in a first direction through the adsorbent bed from a first end to a second end of the bed, and is reduced during intervals of flow in the reverse direction. As the cycle is repeated, the less readily adsorbed component is concentrated in the first direction, while the more readily adsorbed component is concentrated in the reverse direction.

A "light" product, depleted in the more readily adsorbed component and enriched in the less readily adsorbed component, is then delivered from the second end of the bed. A "heavy" product enriched in the more strongly adsorbed component is exhausted from the first end of the bed. Typically, the feed is admitted to the first end of a bed and the second product delivered from the second end of the bed when the pressure in that bed is elevated to a higher working pressure, while the second product is exhausted from the first end of the bed at a lower working pressure which is the low pressure of the cycle.

The conventional process for gas separation by pressure swing adsorption uses two or more adsorbent beds in parallel, with directional valving at each end of each adsorbent bed to connect the beds in alternating sequence to pressure sources and sinks, thus establishing the changes of working pressure and flow direction. This conventional pressure swing adsorption process makes inefficient use of applied energy, because of irreversible expansion over the valves over large pressure differences while switching the adsorbent beds between higher and lower pressures.

DISCLOSURE OF THE INVENTION

The present invention integrates the chemical reactor with pressure swing adsorption as the product/reactant separation process.

The present invention conducts a chemical reaction in cooperation with a rotary module for pressure swing adsorption separation of the reaction product(s) from the reactant (s), with high energy efficiency and with compact machinery of low capital cost.

The inventive apparatus includes a rotary module for PSA separation of a gas mixture containing a more readily adsorbed component and a less readily adsorbed component, with the more readily adsorbed component being preferentially adsorbed from the feed gas mixture by an adsorbent material under increase of pressure, so as to separate from the gas mixture a heavy product gas enriched in the more readily adsorbed component, and a light product gas enriched in the less readily adsorbed component and depleted in the more readily adsorbed component. The apparatus typically includes axial or centrifugal compression machinery cooperating with one or multiple PSA modules in parallel. Each PSA module comprises a plurality of adsorbers, with each adsorber having a flow path contacting adsorbent material between first and second ends of the flow path.

Each PSA module further has a first valve means cooperating with the adsorbers to admit feed gas to the first ends of the adsorbers, and to exhaust heavy product gas from the first ends of the adsorbers. Each PSA module also has a second valve means cooperating with the adsorbers to deliver light product gas from the second ends of the adsorbers, to withdraw light reflux gas from the second ends of the adsorbers, and to return light reflux gas to the second ends of the adsorbers. The term "light reflux" refers to withdrawal of light gas (enriched in the less readily adsorbed component) from the second ends of adsorbers via the second valve means, followed by pressure let-down and return of that light gas to other adsorbers at a lower pressure via the second valve means. The first and second valve means are operated so as to define the steps of a PSA cycle performed sequentially in each of the adsorbers, while controlling the timings of flow at specified total pressure levels between the adsorbers and the compression machinery.

The PSA process of the invention establishes the PSA cycle in each adsorber, within which the total working pressure in each adsorber is cycled between a higher pressure and a lower pressure of the PSA cycle. The PSA process also provides a plurality of intermediate pressures between the higher and lower pressure. The compression machinery of the apparatus in general include multistage axial or centrifugal compressors and expanders.

In the present invention, the feed compressor will typically supply feed gas, in several stages at discrete intermediate pressures for feed pressurization of the adsorbers as well as the higher pressure for light product production, to the first valve means. The exhauster will typically receive second product gas, in several stages at discrete intermediate pressures for countercurrent blowdown of the adsorbers as well as the lower pressure, from the first valve means. The light reflux expander may also perform pressure let-down on several separate light reflux stages, sequentially drawn from the second valve means at a set of discrete intermediate pressure levels, and after expansion returned to the second valve means at a lower set of discrete intermediate pressure levels. Heat exchangers may be provided to heat gas streams about to be expanded, for thermally boosted energy recovery.

In order for the flowing gas streams entering or exiting the compression machinery at each pressure level to be substantially uniform in pressure and velocity, each PSA module will preferably have a sufficiently large number of adsorbers for several adsorbers to be undergoing each step of the PSA cycle at any moment. During pressurization and blowdown steps, the several adsorbers passing through the step would be in sequentially phased converging approach to the nominal pressure level of each step by a throttling pressure equalization from the pressure level of the previous step experienced by the adsorbers. Flow is being provided to the adsorbers in a pressurization step or withdrawn in a blowdown step by the compression machinery at the nominal pressure level of that step. Hence flow and pressure pulsations seen by the compression machinery at each intermediate pressure level are minimal by averaging from the several adsorbers passing through the step, although each adsorber undergoes large cyclic changes of pressure and flow.

A preferred way to provide a large number of absorbers in a mechanically simple PSA module is to install those adsorbers as angularly spaced elements in a rotor, whose opposed faces engaging across sealing faces with a ported stator sealing faces will provide the first and second valve means. By providing a sufficient number of ports with suitable angular spacing to accommodate each of the desired pressure levels (higher, lower and intermediate) in each of the first and second valve faces, a desired PSA cycle can be achieved.

If a smaller number of adsorbers is used in each PSA module, surge absorber chambers will be needed to isolate each stage of the compression machinery from excessive pulsations of flow and pressure. With sufficiently large surge absorber chambers, flow and pressure pulsations seen by the compression machinery are again minimized.

The principle of using compression and expansion machinery (with compression performed predominantly in communication with the first ends of the adsorbers, and expansion energy recovery performed on cocurrent blowdown from the second ends of the adsorbers) to generate a high performance PSA cycle is referred to as "Thermally Coupled Pressure Swing Adsorption" or TCPSA, because of the inherent heat pumping aspect resulting from a close mechanical analogy to Stirling or Ericsson cycle thermodynamic engines.

Energy recovery is performed by expansion of countercurrent blowdown gas (when those steps are performed at superatmospheric pressure), and by expansion over the pressure letdown expanders between the light reflux exit and return compartments. The present invention provides multistage or split stream compression/expansion machinery for the multiple gas flows at multiple closely spaced intermediate pressure levels, enabled by the present PSA process. The multistage machinery may be provided as separate machines operating in series or parallel, or preferably as multiple impellers in tandem on a single shaft within a single casing. Heat exchangers may be optionally provided as compression intercoolers to reject heat of compression, and as heaters to heat either (or both) the countercurrent blowdown gas or the light reflux gas about to be expanded. The heater may be provided with heat from an external source, or may use heat of compression from the compression intercoolers as another mode of energy recovery within the apparatus and process of the invention. Heat may also be provided to or removed the adsorbers by providing heat exchange surfaces within the rotor.

DETAILED DESCRIPTION OF PREFERRED EMBODIMENTS

Figure 1:
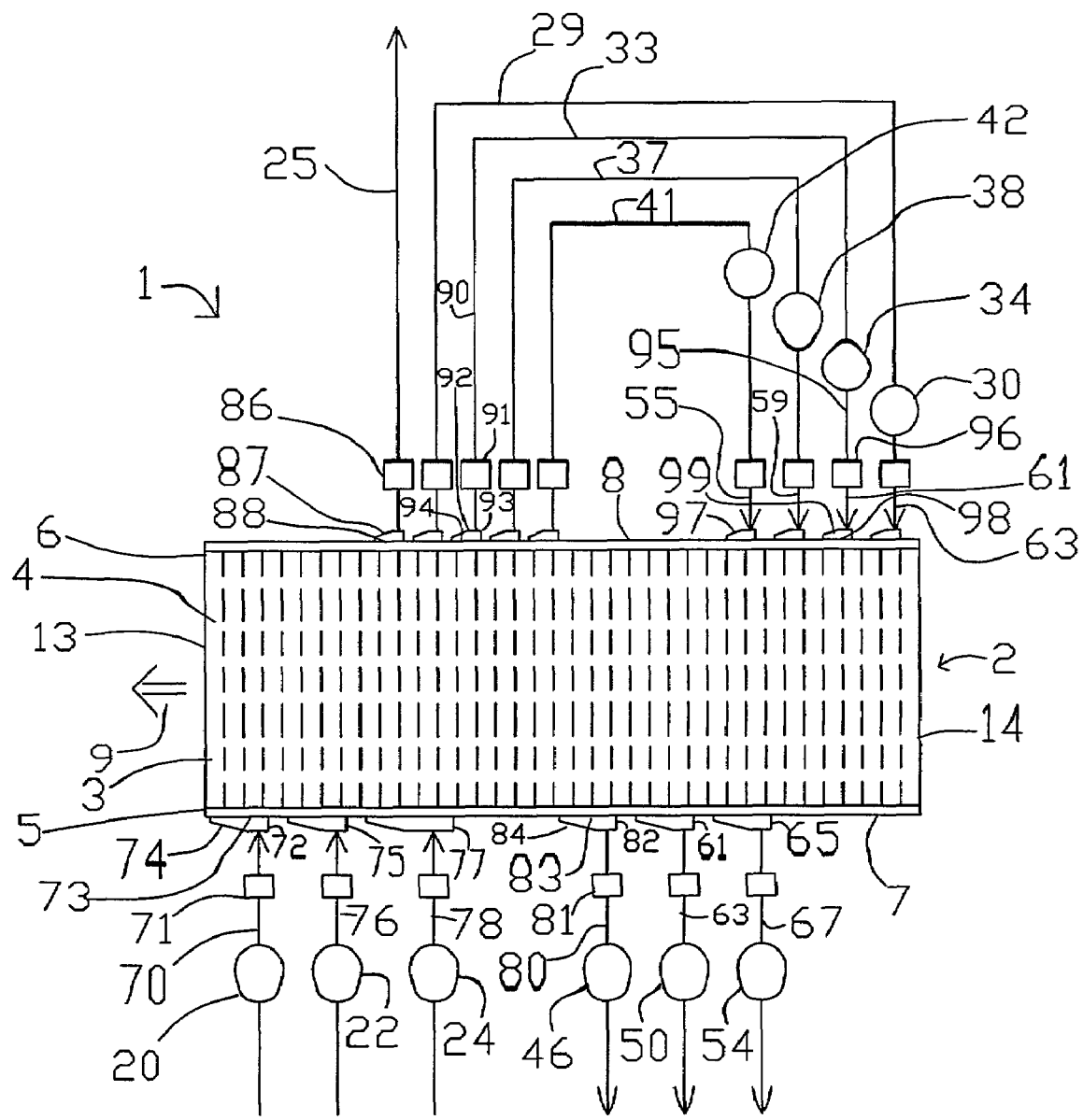
FIG. 1 shows a simplified schematic of a PSA apparatus.
Figure 2:
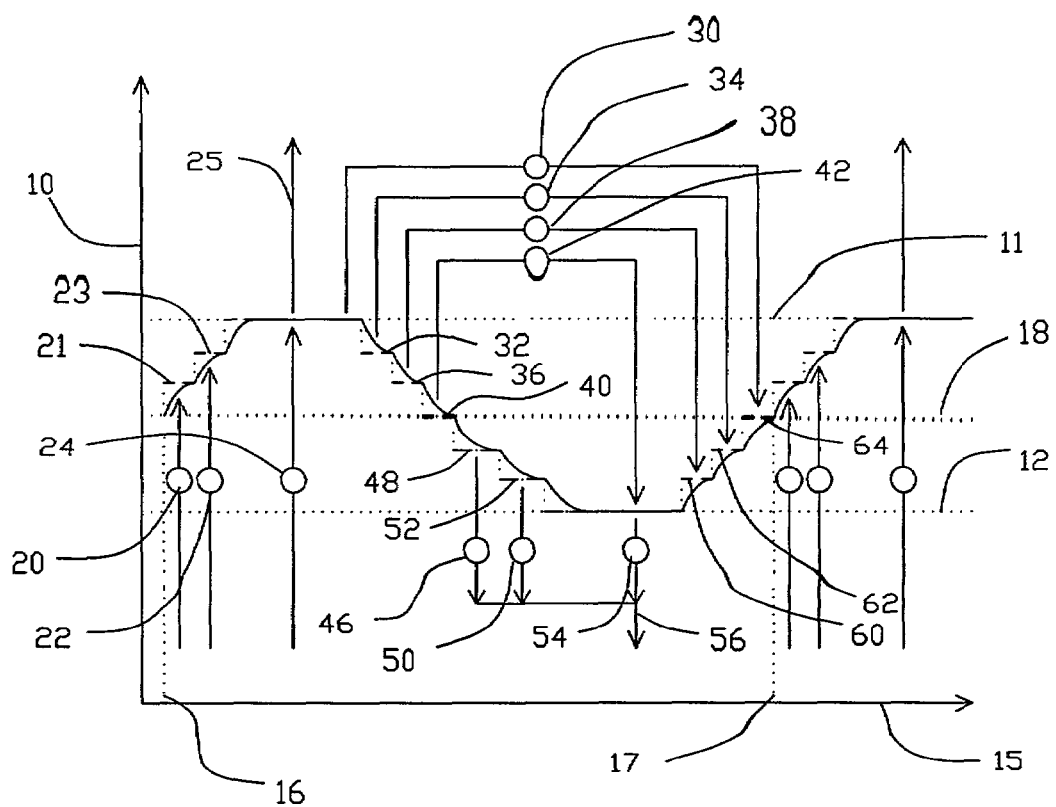
FIG. 2 shows a typical PSA cycle, in the format to which the invention shall be applied.

FIGS. 1 and 2

FIG. 1 shows an elementary PSA apparatus 1 with an adsorber assembly 2 having a plurality of "N" cooperating adsorbers 3 in parallel. Each adsorber 3 has a flow path 4 between first end 5 and second end 6 of the adsorber 3, with adsorbent material contacting the flow path. Cooperating with the adsorbers 3 are first valve means 7 and second valve means 8. Arrow 9 indicates the direction of progression of the adsorbers 3 in being connected to ports of the first and second valve means 7, 8 as shown in FIG. 1. In the case of a rotary adsorber, as in the preferred embodiments of the invention, adsorber rotor 2 is shown in FIG. 1 unrolled in a 360° section about its rotary axis so that rotation causes the adsorbers 3 to advance in the direction of arrow 9 to undergo the cycle of FIG. 2.

The left hand edge 13 of the unrolled view of rotor 2 returns to right hand edge 14 after rotation of 360°. It is also possible within the invention to have an integral multiple of "M" groups of "N" adsorbers in a single rotor 2, so that the angular extent for edge 13 to edge 14 is 360°/M. This has the disadvantage of greater complexity of fluid connections to the first and second valve means 7, 8, but the advantages of slower rotational speed (by a factor of "M" for the same PSA cycle frequency) and a symmetric pressure and stress distribution. With "M"=2, FIG. 1 represents each 180° side of a rotor according to the invention.

FIG. 2 shows the PSA cycle undergone sequentially by each of the "N" adsorbers 3 over a cycle period "T". The cycle in consecutive adsorbers 3 is displaced in phase by a time interval of T/N. In FIG. 2 the vertical axis 10 indicates the working pressure in an adsorber element are here neglected. The higher and lower working pressures of the PSA process are respectively indicated by dotted lines 11 and 12.

The horizontal axis 15 indicates time, with the PSA cycle period defined by the time interval between points 16 and 17. At times 16 and 17, the working pressure in the first adsorber 3 on the left in FIG. 1 is pressure 18. Starting from time 16, the cycle begins as the first end 5 of adsorber 3 is opened by the first valve means 7 to first feed supply means 20 at the first intermediate feed pressure 21. The pressure in adsorber 3 rises from pressure 18 at time 17 to the first intermediate feed pressure 21. Proceeding ahead, the first end 5 is opened next to second feed supply means 22 at the second intermediate feed pressure 23. The adsorber pressure rises to the second intermediate feed pressure.

Then the first end 5 is opened to a third feed supply means 24 at the higher pressure 11 of the PSA process. Once the adsorber pressure has risen to substantially the higher working pressure, its second end 6 is opened by the second valve means 8 to light product delivery conduit 25 to deliver purified light product. While feed gas is still being supplied to the first end of adsorber 3 from the third feed supply means 24, the second end 6 is next closed to light product delivery conduit 25, and is opened to deliver "light reflux" gas (enriched in the less readily adsorbed component, similar to second product gas) by conduit 29 to first light reflux pressure let-down means 30. The light reflux pressure let-down means 30 may be an expander with optional heat exchangers such as an inlet heater, or a throttle orifice. All or some of the feed supply means may be feed compression stages.

The first end 5 of adsorber 3 is then closed by the first valve means 7, while the second end 6 is opened successively by the second valve means 8 to (a) drop the adsorber pressure to the first cocurrent blowdown pressure 32 while delivering light reflux gas by conduit 33 to second light reflux pressure letdown means 34, (b) drop the adsorber pressure to the second cocurrent blowdown pressure 36 while delivering light reflux gas by conduit 37 to third light reflux pressure letdown means 38, and (c) drop the adsorber pressure to the third cocurrent blowdown pressure 40 while delivering light reflux gas by conduit 41 to fourth light reflux pressure letdown means 42. Second end 6 is then closed for an interval, until the light reflux return steps following the countercurrent blowdown steps.

The light reflux pressure let-down means 30, 34, 38, 42 may be mechanical expansion stages for expansion energy recovery, or may be restrictor orifices or throttle valves for irreversible pressure let-down.

Either when the second end 6 is closed after the final light reflux exit step (as shown in FIG. 2), or earlier while light reflux exit steps are still underway, first end 5 is opened to first exhaust means 46, dropping the adsorber pressure to the first countercurrent blowdown intermediate pressure 48 while releasing "heavy" gas (enriched in the more strongly adsorbed component) to the first exhaust means 46. Next, first end 5 is opened to second exhaust means 50, dropping the adsorber pressure to the second countercurrent blowdown intermediate pressure 52 while releasing "heavy" gas. Then first end 5 is opened to third exhaust means 54, dropping the adsorber pressure to the lower pressure 12 of the PSA process white releasing "heavy" gas. Once the adsorber pressure has substantially reached the lower pressure while first end 5 is open to the third exhaust means 54, the second end 6 is opened to receive fourth light reflux gas (as purge gas) from fourth light reflux pressure let-down means 42 by conduit 55 in order to displace more heavy gas into the third exhaust means 54. The heavy gas from the first, second and third exhaust 46, 50, 54 means may be delivered together as the heavy product 56. All or some of the exhaust means may be mechanical exhauster stages, alternatively either expansion stages if the pressure is to be reduced, or vacuum pumping stages if the pressure is to be increased to ambient pressure, or exhaust compression stages if the exhaust of second product is to be delivered at an elevated pressure. An exhaust means may also be provided by venting to an external sink, e.g. the ambient atmosphere.

The adsorber 3 is then repressurized by light reflux gas after the first end 5 is closed. In succession, the second end 6 is opened (a) to receive light reflux gas by conduit 59 from the third light reflux pressure letdown means 38 to raise the adsorber pressure to the first light reflux pressurization pressure 60, (b) to receive light reflux gas by conduit 61 from the second light reflux pressure letdown means 34 to raise the adsorber pressure to the second light reflux pressurization pressure 62, and (c) to receive light reflux gas by conduit 63 from the first light reflux pressure letdown means 30 to raise the adsorber pressure to the third light reflux pressurization pressure. Unless feed pressurization has already been started while light reflux return for light reflux pressurization is still underway, the process begins feed pressurization for the next cycle after time 17 as soon as the third light reflux pressurization step has been concluded.

From each feed supply means (e.g. 20), the feed flow is delivered by a conduit 70 through an optional surge absorber chamber 71 to a feed compartment 72 opening to a feed port 73 in first valve means 7. Feed compartment 72 may be open to several adsorbers 3 simultaneously, and may have a restricted entrance 74 so as to provide a gradual throttling equalization of pressure as each adsorber 3 is opened to feed compartment 72. First feed pressurization compartment 72 is fed by conduit 70, second feed pressurization compartment 75 is fed by conduit 76, and feed production supply compartment 77 is fed by conduit 78.

To each exhaust means (e.g. 46), the exhaust flow is delivered by a conduit 80 through an optional surge absorber chamber 81 from an exhaust compartment 82 opening to an exhaust port 83 in first valve means 7. Exhaust compartment 82 may be open to several adsorbers 3 simultaneously, and may have a restricted entrance 84 so as to provide a gradual throttling equalization of pressure as each adsorber 3 is opened to exhaust compartment 82. To label the exhaust compartments, first countercurrent blowdown exhaust compartment 82 exhausts to conduit 80, a second countercurrent blowdown exhaust compartment 61 exhausts to conduit 63, and a purge exhaust compartment 65 exhausts to conduit 67.

To light product delivery conduit 25, the light product is delivered through an optional surge absorber chamber 86 from light product exit compartment 87 opening to a light product port 88 in second valve means 8.

To each light reflux pressure letdown means (e.g. 34), the light reflux flow is delivered by a conduit 90 through an optional surge absorber chamber 91 from a light reflux exit compartment 92 opening to a light reflux exit port 93 in second valve means 8. Light reflux exit compartment 92 may be open to several adsorbers simultaneously, and may have a restricted entrance 94 so as to provide a gradual throttling equalization of pressure as each adsorber 3 is opened to light reflux exit compartment 92.

From each light reflux pressure letdown means (e.g. 34), the light reflux flow is delivered by a conduit 95 through an optional surge absorber chamber 96 to a light reflux entrance compartment 97 opening to a light reflux entrance port 98 in second valve means 8. Light reflux exit compartment 97 may be open to several adsorbers 3 simultaneously, and may have a restricted entrance 99 so as to provide a gradual throttling equalization of pressure as each adsorber 3 is opened to light reflux entrance compartment 97.

The rate of pressure change in each pressurization or blowdown step may thus be restricted by throttling in compartments of the first and second valve means 7, 8, or by throttling in the ports at first and second ends 5, 6, of the adsorbers 3, resulting in the typical pressure waveform depicted in FIG. 2. Excessively rapid rates of pressure change would subject the adsorber 3 to mechanical stress, while also causing flow transients which would tend to increase axial dispersion of the concentration wavefront in the adsorber 3. Pulsations of flow and pressure are minimized by having a plurality of adsorbers simultaneously transiting each step of the cycle, and/or by providing surge absorbers in the conduits connecting to the first and second valve means 7, 8.

It will be evident that the cycle shown in FIG. 2 could be generalized by having more or fewer intermediate stages in each major step of feed pressurization, countercurrent blowdown exhaust, or light reflux. In particular, adsorber pressurization could be achieved entirely by feed pressurization (or by pressurization with a component of the feed), or by light reflux repressurization. Furthermore, the length of the steps may be changed readily by changing the angular width of the ports. Thus, it may be desirable to extend the duration of the production and purge steps at respectively the higher and lower pressures of the process in order to reduce pressure drop in the adsorbers 3 during those steps. Conversely, relatively gradual pressurization and blowdown steps may be desirable to overcome kinetic constraints or mechanical stress limitations.

The first end 5 and second end 6 of the adsorbers 3 will be maintained at temperatures T1 and T2 respectively.

FIG. 3

Figure 3:
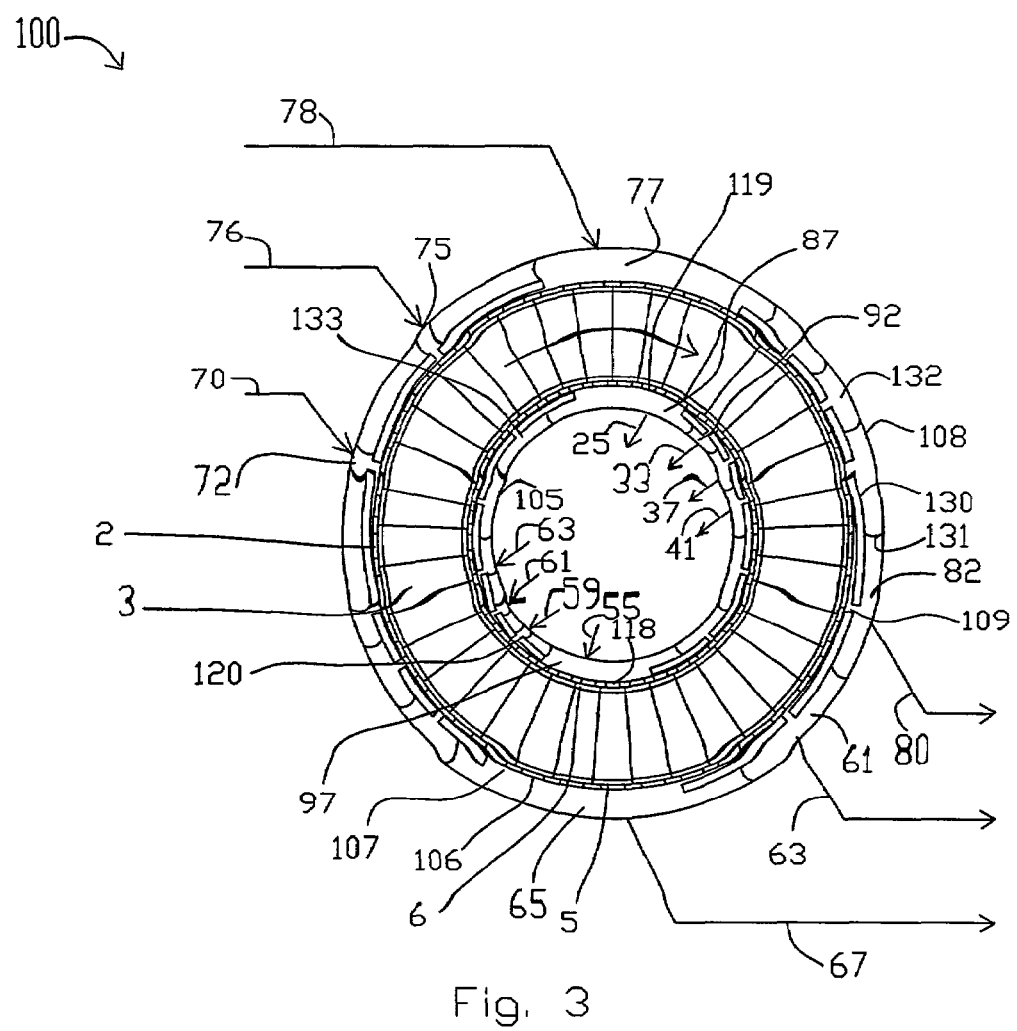
FIG. 3 shows a sectional view of a rotary module configured for radial flow.

FIG. 3 shows a sectional view of a rotary module 100 configured for radial flow. Rotor 2 contains the "N" adsorbers 3, with the flow path here oriented radially between first end 5 and second end 6 of the adsorbers 3. The adsorber first ends 5 open by apertures 106 to a sealing face 107 with the first valve stator 108, which has ports 109 to define the first valve means 7. First valve stator 108 has a plurality of functional compartments in fluid communication to sealing face 107 by ports 109, including a first feed pressurization supply compartment 72, a second first feed pressurization supply compartment 75, a feed production supply compartment 77 at substantially the higher pressure, a first countercurrent blowdown exhaust compartment 82, a second countercurrent blowdown exhaust compartment 61, and a purge exhaust compartment 65 at substantially the lower pressure.

The adsorber second ends 6 open by apertures 118 to a sealing face 119 with the second valve stator 105 which has ports 120 to define the second valve means 8. Second valve stator 105 includes, with each compartment in fluid communication to sealing face 119 by ports 120, a light product delivery compartment 87 at substantially the higher pressure, a first light reflux exit compartment which is here simply the downstream end of compartment 87 delivering gas to conduit 25, a second light reflux exit compartment 92 delivering gas to conduit 33, third and fourth light reflux exit compartments delivering gas to conduits 37 and 41 respectively, a fourth light reflux return compartment 97 receiving purge gas from conduit 55 at substantially the lower pressure, a third light reflux return compartment receiving gas from conduit 59, a second light reflux return compartment receiving gas from conduit 61, and a first light reflux return compartment receiving gas from conduit 63. The angular spacing of ports communicating to the compartments in the first and second valve stators 108, 105 defines the timing of the PSA cycle steps similar to the cycle of FIG. 2.

In this example, sealing faces 107 and 119 are respectively defined by the outer and inner radii of the annular rotor 2. Fluid sealing between the functional compartments the in sealing faces 117 and 119 is achieved by clearance seals. The clearance seals are provided as slippers 130 attached to the first and second valve stators 108, 105 by partitions 131. Partitions 131 provide static sealing between adjacent compartments. Slippers 130 engage the sealing faces 107, 119 with narrow fluid sealing clearances, which also provide throttling of gas flows between the adsorbers 3 and functional compartments in each pressure-changing step, so that each adsorber may smoothly equalize in pressure to the pressure of the next functional compartment about to be opened to that adsorber 3. In addition to the functional compartments, static pressure balancing compartments (e.g. 132 and 133) are provided behind some clearance seal slippers 130. The static pressure balancing compartments are disposed in angular sectors of the first and second valve stators 108, 105 not used as functional compartments, in order to establish a controlled pressure distribution behind the clearance slippers 130 so as to maintain their positive sealing engagement without excessive contact pressure and consequent friction.

Figure 4:
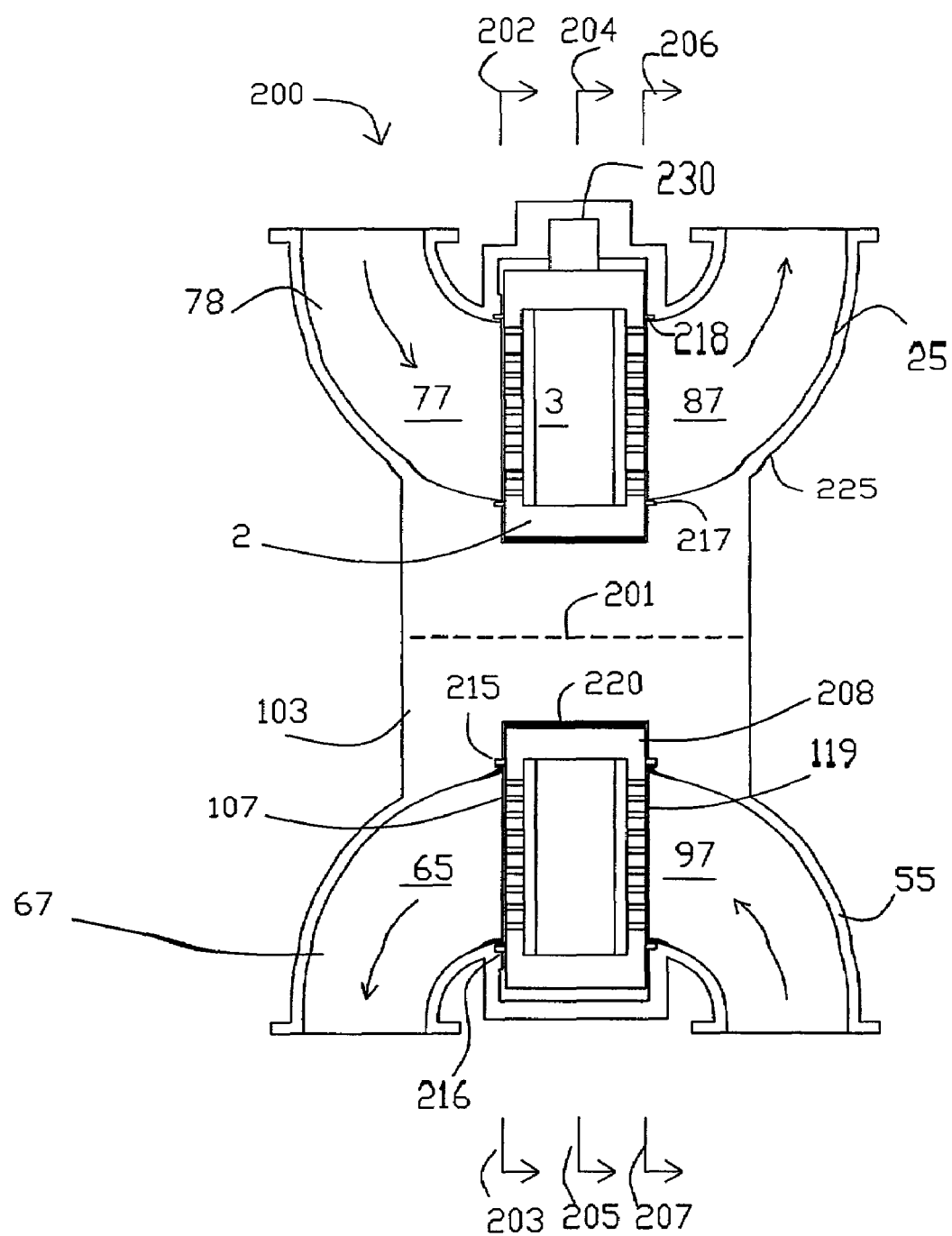
FIG. 4 shows a sectional view of a rotary module configured for axial flow.
Figure 5:
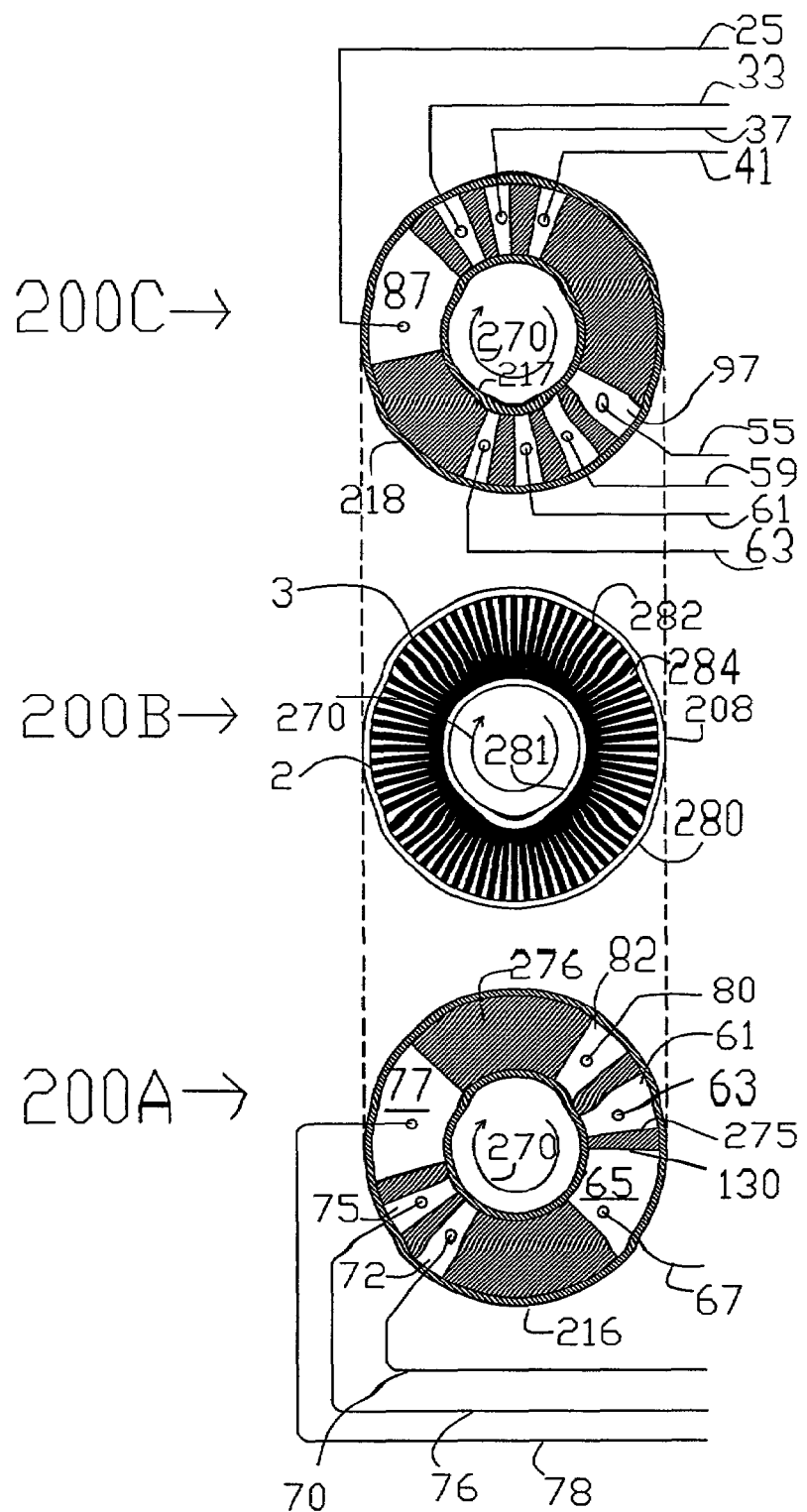
FIG. 5 shows sectional views of the first valve face, the adsorbers, and the second valve face of the rotary module of FIG. 4.

FIGS. 4 and 5

FIG. 4 shows a sectional view of a rotary module 200 configured for axial flow, while FIG. 5 shows sectional views of the first valve face, the adsorbers 3, and the second valve face of the rotary module of FIG. 4. The flow path in adsorbers 3 is now parallel to axis 201. The steps of the process and functional compartments are still in the same angular relationship regardless of a radial or axial flow direction in the adsorbers 3. Sections 200A, 200B and 200C are cross sections of module 200 in the planes respectively defined by arrows 202–203, 204–205, and 206–207. FIG. 4 is an axial section of module 200 through compartments 77 and 87 at the higher pressure, and compartments 65 and 97 at the lower pressure. The adsorber rotor 2 contains the "N" adsorbers 3 in adsorber wheel 208, and revolves within stator 103.

At the ends of rotor 2, circumferential seals 215 and 216 bound first sealing face 107, and circumferential seals 217 and 218 bound second sealing face 119. The sealing faces are flat discs. The circumferential seals also define the ends of clearance slippers 130 in the sealing faces between the functional compartments. Rotor 2 is supported by bearing 220 in housing 225, which is integrally assembled with the first and second valve stators. Rotor 2 is driven by rim drive motor 230, which may have a friction, geared or belt engagement with the outer rim of rotor 2.

Section 200A shows the first valve face of embodiment 200 of FIG. 4, at section 202–203, with fluid connections to feed and to countercurrent blowdown. Arrow 270 indicates the direction of rotation by adsorber rotor 2. The open area of valve face 107 ported to the feed and exhaust compartments is indicated by clear angular segments 77, 82, 61, 65, 72, 75, and 77 corresponding to those functional compartments, between circumferential seals 215 and 216. The substantially closed area of valve face 107 between functional compartments is indicated by cross-hatched sectors 275; and 276 which are clearance slippers 130. Typical closed sector 275 provides a transition for an adsorber, between being open between two adjacent compartments. Gradual opening is provided by a tapering clearance channel between the slipper and the sealing face, so as to achieve gentle pressure equalization of an adsorber being opened to a new compartment. Much wider closed sectors (e.g. 276) are provided to substantially close flow to or from one end of the adsorbers 3 when pressurization or blowdown is being performed from the other end.

Section 200 C is the second valve face of embodiment 200 of FIG. 4, at section 206–207. Similar principles and alternatives apply to radial flow and axial flow geometries, respectively sealing on cylindrical or disc faces.

Section 200 B is an adsorber wheel configuration for the embodiment of FIG. 4, at section 204–205. The adsorber configuration is similar to a radial flow geometry shown in copending U.S. patent application Ser. No. 08/995,906. Here, "N"=72. The adsorbers 3 are mounted between outer wall 280 and inner wall 281 of adsorber wheel 208. Each adsorber comprises a rectangular flat pack which is laminated of adsorbent sheets 282, with spaces between the sheets to define flow channels here in the axial direction. Separators 284 are provided between the adsorbers to fill void space and prevent leakage between the adsorbers 3.

The adsorbent sheets 282 comprise a reinforcement material, in preferred embodiments glass fibre, metal foil or wire mesh, to which the adsorbent material is attached with a suitable binder. Typical adsorbents include zeolites, many of which are also active as catalysts for reactions of interest. The zeolite crystals are bound with silica, clay and other binders, or self-bound, within the adsorbent sheet matrix.

Satisfactory adsorbent sheets have been made by coating a slurry of zeolite crystals with binder constituents onto the reinforcement material, with successful examples including nonwoven fiber glass scrims, woven metal fabrics, and expanded aluminum foils. Spacers are provided by printing or embossing the adsorbent sheet with a raised pattern, or by placing a fabricated spacer between adjacent pairs of adsorbent sheets. Alternative satisfactory spacers have been provided as woven metal screens, non-woven fiber glass scrims, and metal foils with etched flow channels in a photolithographic pattern.

Typical experimental sheet thicknesses have been 150 microns, with spacer heights in the range of 100 microns, and adsorber flow channel length approximately 20 cm.

FIG. 6

An apparatus 300 for conducting an exothermic reaction, in the example of ammonia synthesis, conducts the reaction within a zone 301 adjacent the second ends 6 of the adsorbers 3 in the rotary module. Zone 301 has catalyst active for stimulating the reaction in an extended portion of the adsorbers 3, with the catalyst preferably supported on sheets in a laminated parallel passage structure as described above for adsorbent sheets. The flow paths through the rotor include flow channels contacting adsorbent material, and the catalyst in zone 301 thereof.

Figure 6:
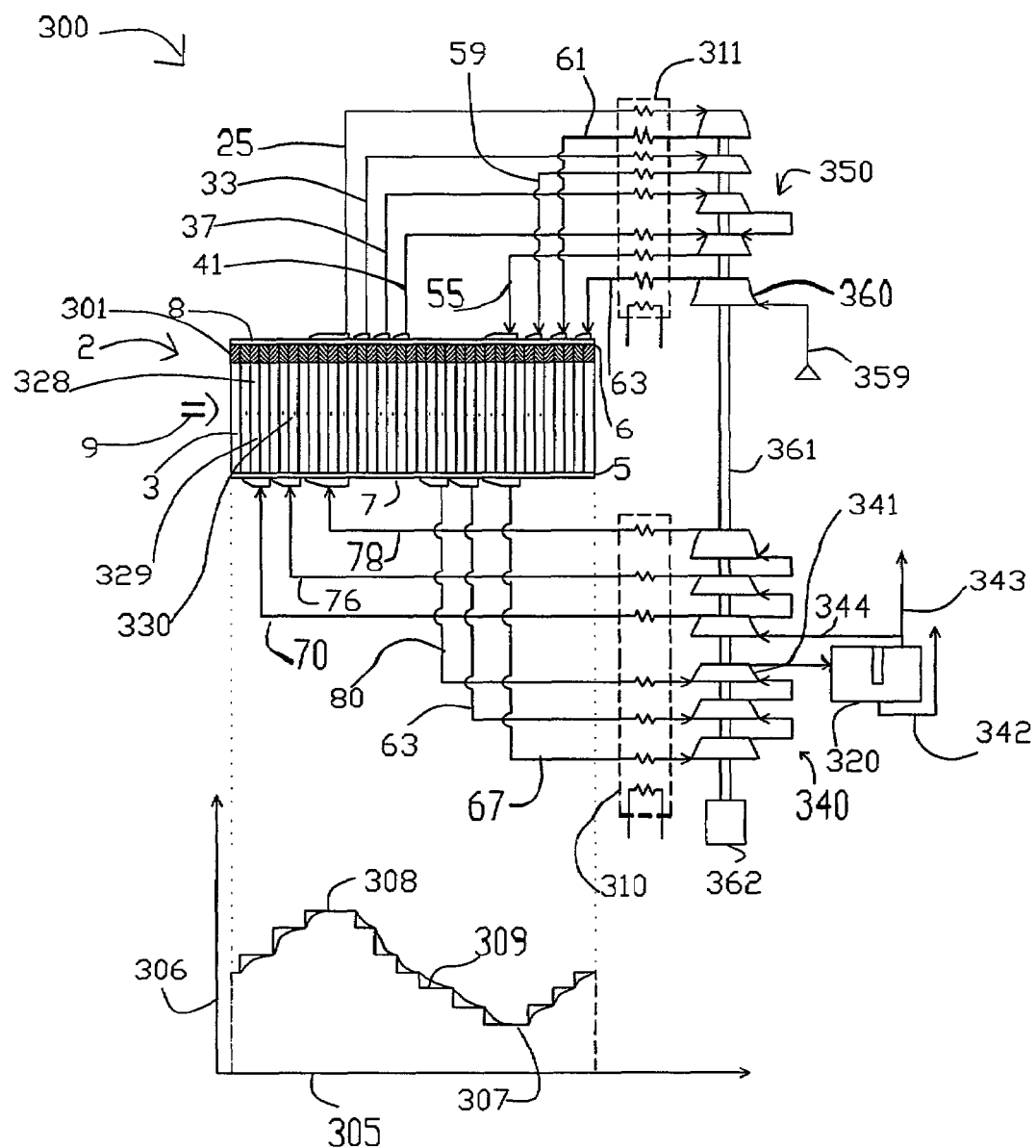
FIG. 6 is a simplified schematic of an apparatus for conducting an exothermic reaction, with the chemical reaction performed within a zone of the adsorbers in the rotary module.

The lower part of FIG. 6 shows the PSA cycle pressure pattern, coordinated on horizontal time axis 305 with the angular sequence of the functional compartments in the first and second valve faces 7 and 8 as shown in the upper part of FIG. 6. The vertical pressure axis 306 spans the PSA cycle lower pressure 307, upper pressure 308, and an intermediate pressure 309.

The first end 5 of the adsorbers 3 are maintained at approximately a first temperature T1 by heat exchanger means 310 cooperating with the conduits communicating with the second function compartments. The second end 6 of the adsorbers 3 are maintained at approximately a second temperature T2 by heat exchanger means 311 cooperating with the conduits communicating with the second function compartments. In this embodiment, the reaction is conducted at elevated temperature, approximately temperature T2. A product of the reaction is condensed in a product separator 320 at a lower temperature, which may be approximately temperature T1.

With a large temperature difference between T1 and T2, the adsorbers 3 must support a corresponding temperature gradient along the flow path, and consequently cyclic regenerative heat exchange will take place between the cyclically reversing gas flow in the flow path and the heat capacity of solid material in the flow path including the adsorbent material, any adsorbent support material and reinforcement thereof, and any spacers associated with flow channels. It is therefore preferred to incorporate ample solid material heat capacity in the flow path, and with intimate thermal contact to the flow channels. In this embodiment the thermal conduction path in the solid material along the flow path would preferably be interrupted at frequent intervals, so as avoid a large thermal conductance of the solid material along the flow path. It is also desirable to layer the adsorbent material with optimally selected adsorbents in different zones (e.g. adsorbent zones 328 and 329 divided by zone boundary 330) of differing temperature.

Apparatus 300 includes a multistage compressor 340 with multiple inlet and delivery ports for receiving gas enriched in the more adsorbed component from conduits 80, 63 and 67, and compressing that gas back to conduits 80, 63 and 67. The process thus includes withdrawing gas enriched in the more readily adsorbed component from the first valve face, compressing that gas to an increased pressure, and refluxing that gas to the first valve face and thence the flow paths at the increased pressure, so as to increase the concentration of the more readily adsorbed component adjacent the first valve face. Following a stage 341 of compressor 340, a stream gas enriched in the more readily adsorbed component is passed though condenser 320 from which a liquid product of reaction is delivered in conduit 342, a purge stream is optionally delivered by conduit 343 to remove any accumulating inert components, and an overhead stream is returned by conduit 344 to the inlet of the next stage of compressor 340 and thence to the first valve face, or else directly to the first valve face.

The apparatus 300 also includes a multistage expander for receiving gas relatively enriched in the less readily adsorbed component from conduits 25, 33, 37 and 41 communicating to the second valve face, and expanding that gas in parallel streams for return to the second valve face by conduits 61, 59, 55 and 63 respectively.

The apparatus 300 includes a feed supply conduit 359 and an optional feed compressor 360 for supplying a feed gas of the reactants(s) to one or more gas streams entering the first valve face.

Compressor 340 is a heavy reflux compressor and expander 350 is a light reflux expander for performing the PSA cycle. Heavy reflux compressor 340 and feed compressor 360 may be coupled on a single shaft 361 to light reflux expander 350 and a prime mover 362. If the power output of expander 350 exceeds power consumption of compressors 341 and 360, prime mover 362 may be replaced with a generator or other mechanical load to absorb power usefully.

In the example of ammonia synthesis, the reactants are hydrogen and nitrogen which react to produce ammonia, typically over a promoted iron catalyst at a temperature T2 in the approximate range of 400° C. to 500° C. A bench scale apparatus, using a compression piston to provide the function of the heavy reflux compressor and using an expansion piston to provide the function of the light reflux compressor, was operated with a single granular adsorber in the mechanical embodiment of U.S. Pat. No. 4,702,903. The adsorber was loaded with reduced iron catalyst 301, 13-X zeolite as the adsorbent in zone 309, and silica gel as the adsorbent in zone 308 according to the reference numerals of the present invention. The upper pressure of the PSA cycle was approximately 800 kPa, and the lower pressure was approximately 400 kPa. The feed was a mixture of hydrogen and nitrogen. Gas composition adjacent the second end 6 was approximately 70% hydrogen, 28% nitrogen, and 2% ammonia. Composition of product (delivered as vapour) from adjacent the second end was approximately 0% hydrogen, 40% nitrogen and 60% ammonia. Hence the directly integrated reactor and PSA device was able to produce and concentrate ammonia product, achieving 100% conversion of feed hydrogen, while shifting the reaction equilibrium so as present a low concentration of the product component over the catalyst so as to enhance the reaction rate of this exothermic reaction at remarkably low pressure.

The apparatus of the present invention enables practicable scale-up and economic realization of a process similar to that of U.S. Pat. No. 4,702,903, using rotational rather than reciprocating machinery.

FIG. 7

Embodiment 400 is another apparatus for conducting an exothermic reaction, similar to embodiment 300 but with the chemical reaction performed in reactors external to the rotary module. This apparatus may also be applied to ammonia synthesis.

Reactors 401, 402, 403 and 404 contain an appropriate catalyst, and are interposed respectively in conduits 25, 33, 37 and 41 to receive gas enriched in the less readily adsorbed reactant components. It will be noted that the reactors operate at different pressures which are steady for each reactor. Optionally, reactors 402, 403 and 404 could be deleted so that the entire reaction is conducted in reactor 401 at the higher pressure.

The exothermic heat of reaction is taken up as heat of expansion in the light reflux expander 350, so as to maintain the desired reaction temperature T2, while also recovering that heat as work of mechanical expansion.

Figure 7:
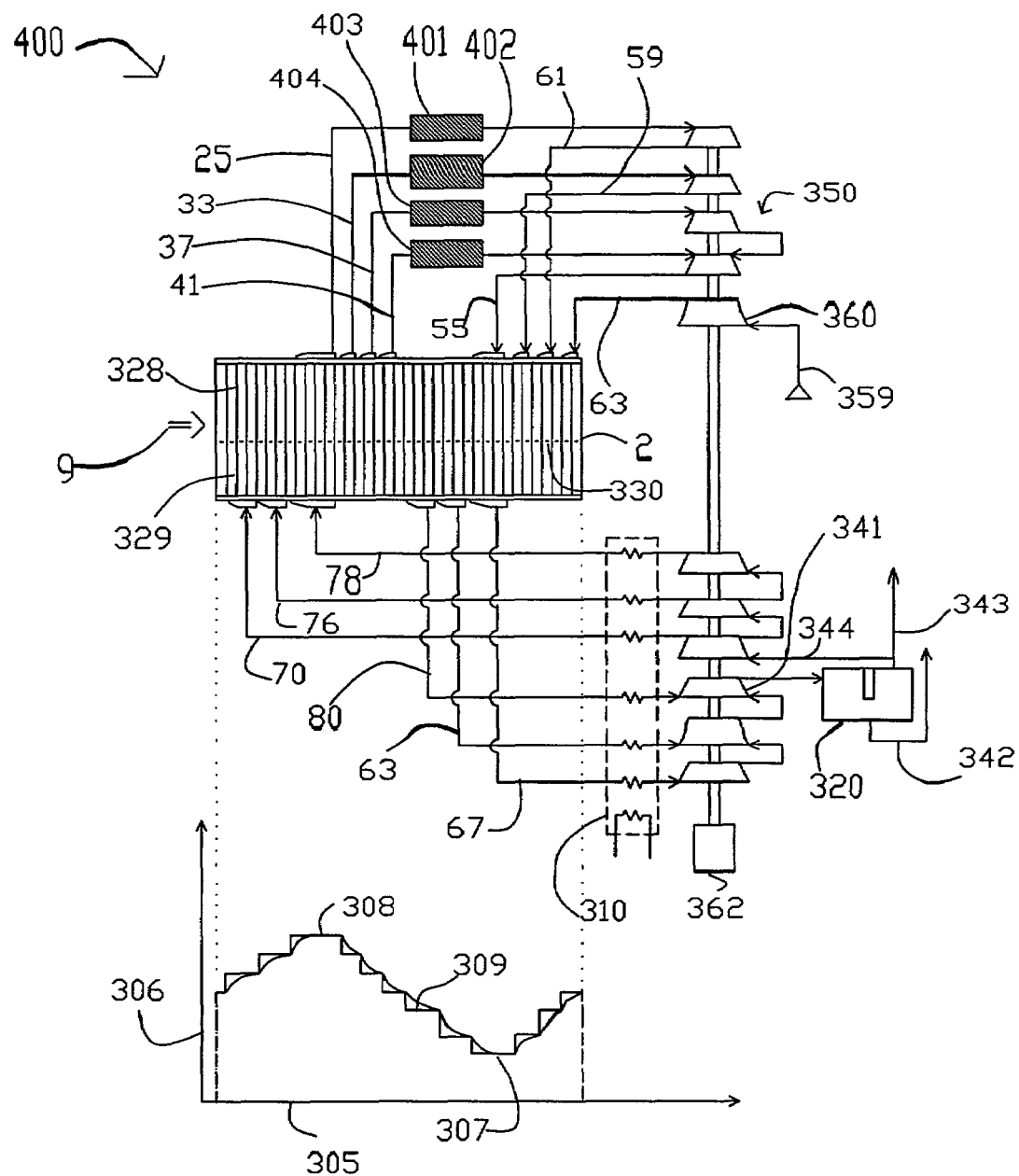
FIG. 7 is a simplified schematic of an apparatus for conducting an exothermic reaction, with the chemical reaction performed in reactors external to the rotary module.

The lower part of FIG. 7 again shows the PSA cycle pressure pattern, as in FIG. 6.

FIG. 8

Figure 8:
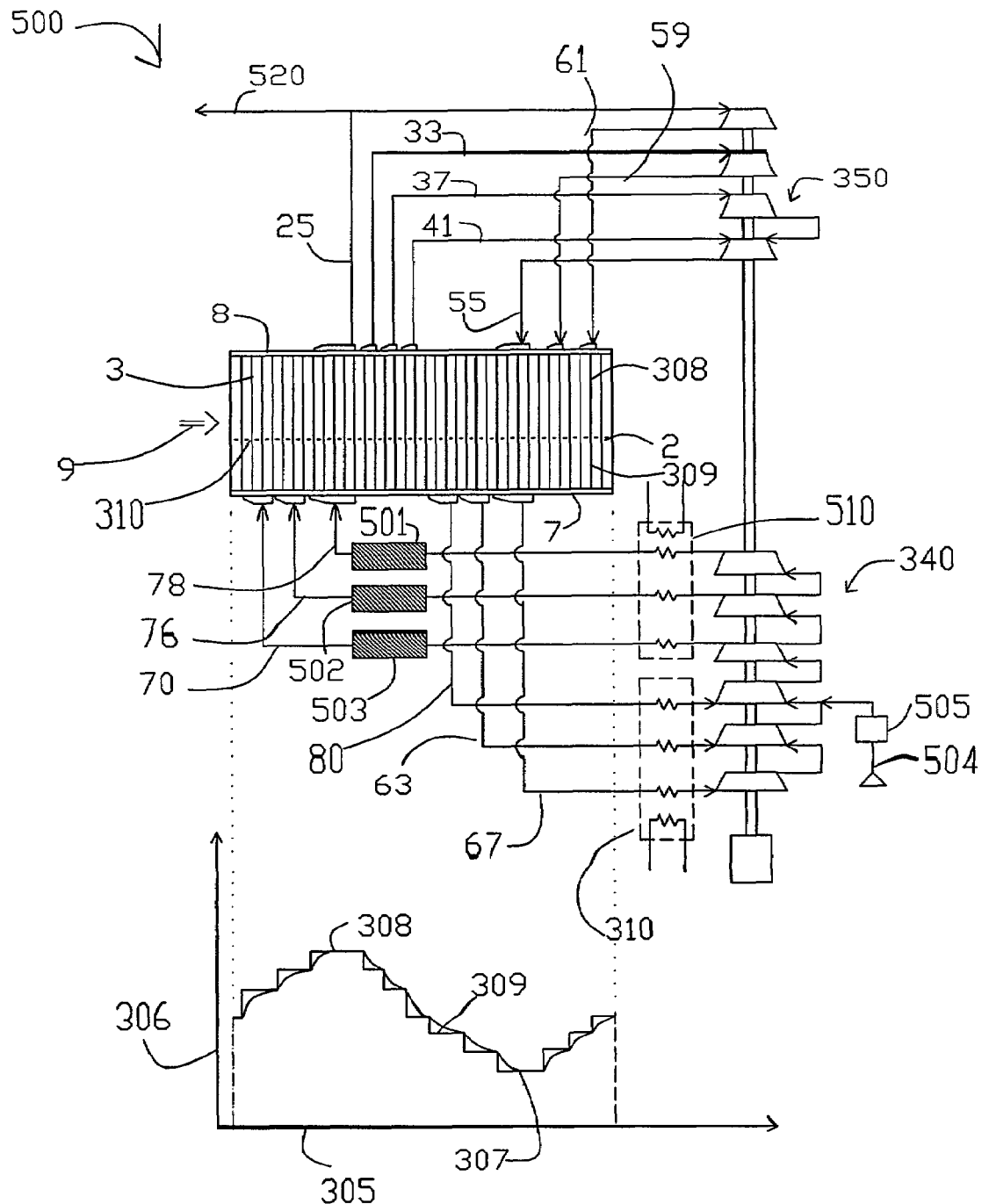
FIG. 8 is a simplified schematic of an apparatus for conducting an endothermic reaction, with the chemical reaction performed in reactors external to the rotary module.

Embodiment 500 is an apparatus for conducting an endothermic reaction, with the chemical reaction performed in reactors external to the rotary module. The PSA cycle pattern is shown in the lower part of FIG. 8. An example application is ammonia dissociation to generate reducing gas as hydrogen.

Reactors 501, 502 and 503 are interposed in conduits 78, 76 and 70 supplying gas to the first valve face 7. If desired, only one reactor (e.g. 501) could be provided. A feed gas containing a relatively more readily adsorbed reactant is supplied to a stage of heavy reflux compressor 340 by infeed conduit 504, which may as needed include a vaporizer 505 to ensure that the reactant(s) are in the vapour phase. Gas enriched in a more readily adsorbed reactant component is withdrawn as heavy reflux gas by conduits 90, 63 and 67 from countercurrent blowdown and exhaust compartments in the first valve face, and is thence delivered to inlet ports of heavy reflux compressor stages. The heavy reflux gas is compressed and is thereby heated by the heat of compression. Optionally, the compressed heavy reflux gas may be further heated from an external source of higher temperature heat in heat exchanger 510, before admission to reactors 501, 502 and 503. In this embodiment, T2 is typically greater than T1, while the temperature of the compressed heavy reflux gas stream entering the reactors (after heavy reflux compression and heating, and any further heating by a heat exchanger 510) will be much greater than T2 (the exit temperature of the exothermic reactors) so that the endothermic heat of reaction may be carried into the reactors as sensible heat of the reactor feed. Alternatively or additionally, the endothermic reactors may be heated externally by a furnace or by other means known in the art.

A purified stream of gas enriched in the less readily adsorbed product components is delivered at approximately the upper pressure by product delivery conduit 520. This stream would be hydrogen and nitrogen, completely purified of ammonia, in the example of ammonia dissociation. In that example, the present invention provides the important advances of 100% conversion of the feed, delivery of a purified product, and practicable operation of the catalytic reactor at much reduced temperature compared to the prior art, because the reactant is concentrated over the catalyst.

Figure 9:
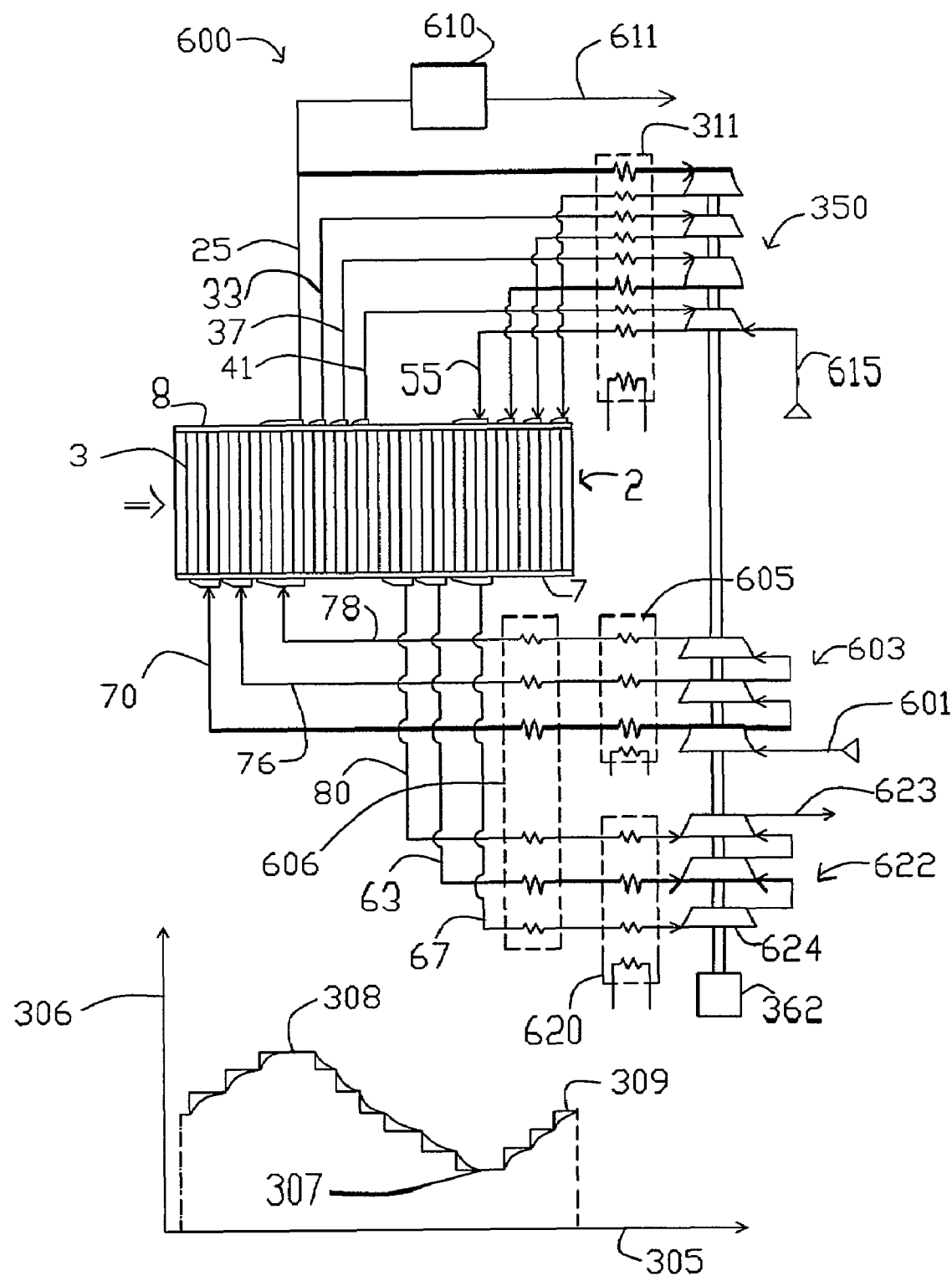
FIG. 9 is simplified schematic of an apparatus for conducting an endothermic reaction in the example of steam methane reforming, with the reaction performed within the adsorbers of the rotary module and with heat exchange to the adsorbers.
Figure 10:
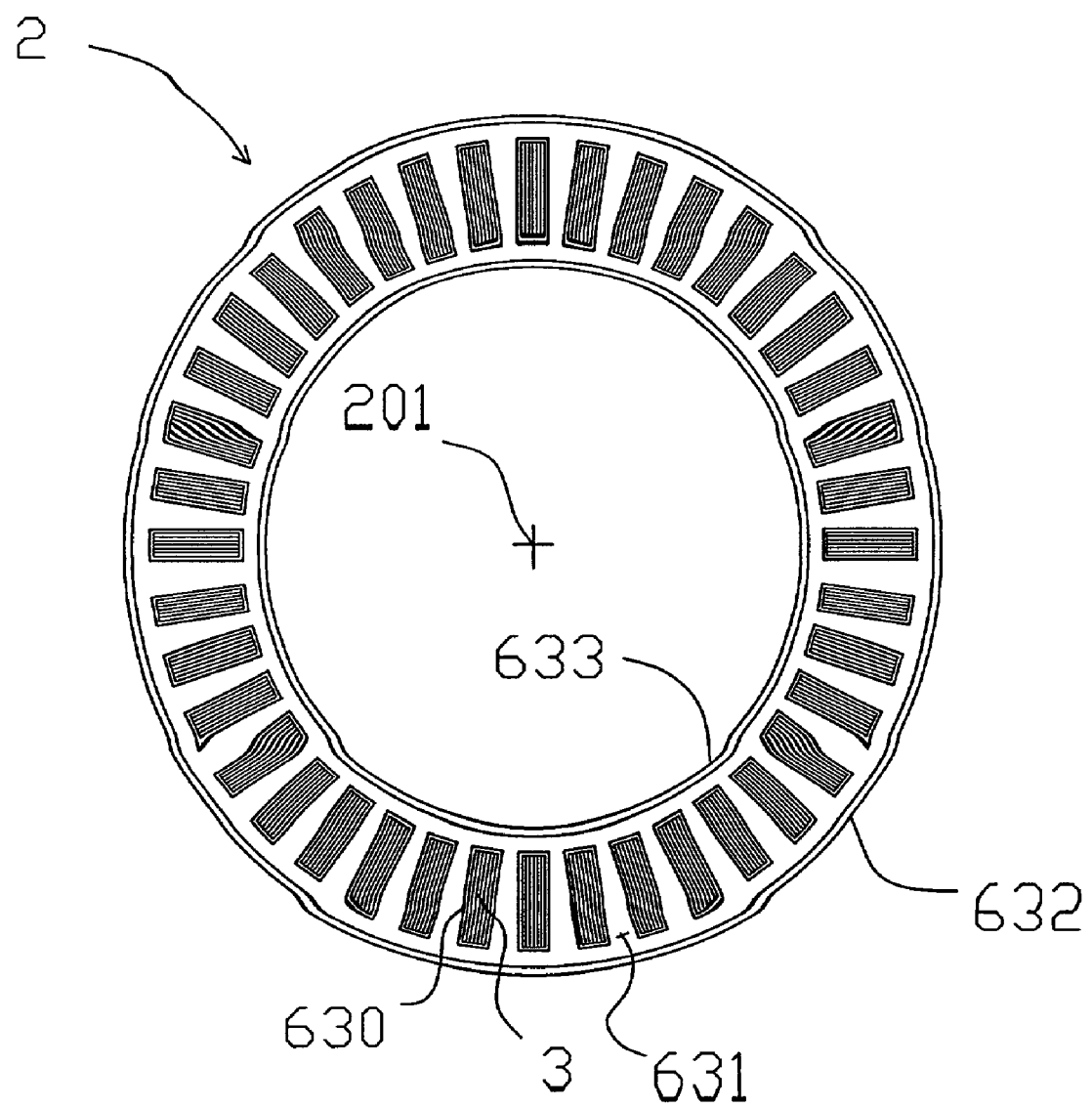
FIG. 10 is a sectioned view of the rotary module of the apparatus of FIG. 9.
Figure 11:
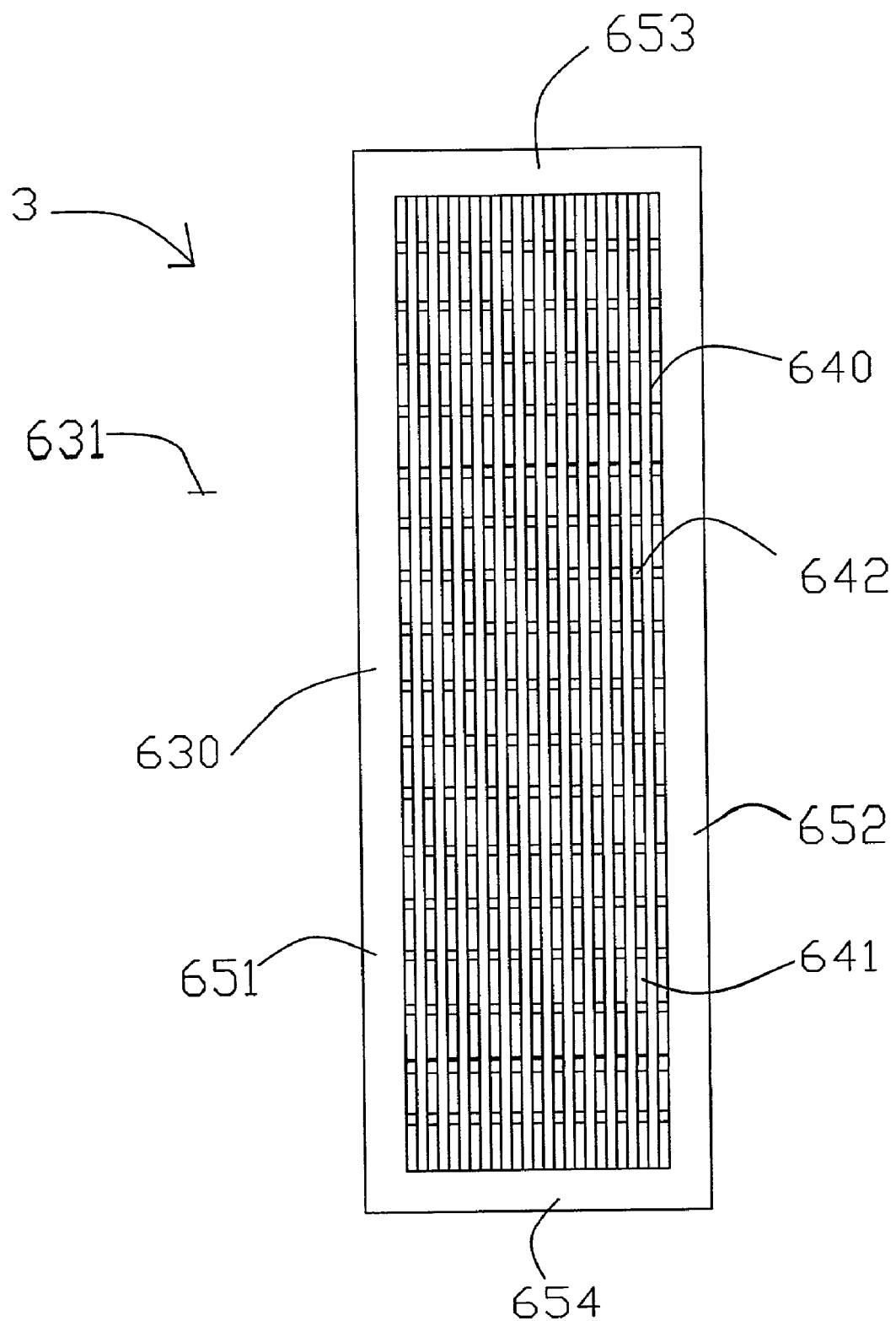
FIG. 11 shows a cross-section of a single absorber of the rotary module of FIG. 10.

FIGS. 9, 10 and 11

Embodiment 600 is an apparatus for conducting an endothermic reaction, with the chemical reaction performed within the rotary module which itself is a heat exchange reactor. An example application is steam methane reforming to produce hydrogen from natural gas. A steam reforming catalyst (e.g. nickel or a platinum group metal supported on alumina) and a high temperature carbon dioxide sorbent are supported in the adsorbers 3. The carbon dioxide sorbent may be based on potassium carbonate promoted hydrotalcite as developed by J. R. Hufton, S. G. Mayorga and S. Sircar ("Sorption Enhanced Reaction Process for Hydrogen Production", AIChEJ 45, 248 (1999)), or another high temperature carbon dioxide sorbent likewise effective in the presence of high steam partial pressure. This sorbent has good working capacity for carbon dioxide in the temperature range of 400° C. to 500° C.

In the steam methane reforming application of embodiment 600, the working temperature of the adsorbers may desirably be near the upper end of the temperature range of 400° C. to 500° C., and T1 and T2 may be substantially the same temperature or moderately different with T2>T1. The feed mixture of desulphurized natural gas and steam is introduced at inlet 601 of multistage feed compressor 603. Preferably, the compressed feed mixture is delivered at successively increasing pressures by conduits 70, 76 and 78 to the first valve face 7 at T1 after heating by heater 605 and recuperator 606.

On entering the adsorbers 3, the feed gas mixture contacts the catalyst which stimulates reaction to hydrogen and carbon oxides. The reacting gas mixture simultaneously contacts the sorbent which withdraws carbon dioxide, thus driving the further reaction of methane with steam to produce hydrogen and the simultaneous reaction of carbon monoxide with steam to produce more hydrogen and carbon dioxide abstracted by the sorbent. Heat is provided to the strongly endothermic reaction by heat exchange within the adsorber, and in part from the exothermic heat of adsorption on the sorbent. Thus, product gas delivered through second valve face 8 to conduit 25 will be hydrogen containing steam, a minor concentration of unconverted methane, and only trace amounts of carbon dioxide and carbon monoxide. The majority portion (other than a fraction for light reflux) of the product in conduit 25 is withdrawn through steam condenser 610 and then delivered from conduit 611 as product for subsequent further purification e.g. by pressure swing adsorption at substantially ambient temperature if required.

Hydrogen-rich gas from conduits 25, 33, 37 and 41 is expanded as light reflux gas through multistage expander 350 cooperating with heat exchanger 311. Low pressure steam may be added to this gas particularly at the lower pressure by purge stream infeed conduit 615 to assist the purge step.

Exhaust gas rich in carbon dioxide is withdrawn from valve face 7 at successively lower pressures during countercurrent blowdown and purge steps through conduits 80, 63 and 67. These streams are cooled in recuperator 606 to assist preheating the feed, and then further cooled by heat exchanger 620. The carbon dioxide exhaust streams are then expanded or compressed as desired for delivery (after catalytic combustion to recover residual energy value from any slip of methane, carbon monoxide and hydrogen) as a second product stream of pure carbon dioxide or for disposal to atmosphere. In depicted embodiment 600, the exhaust gas from conduits 80, 63 and 67 is compressed by multistage compressor 622 and delivered as the second product by conduit 623. This embodiment allows the lower pressure of the process to be subatmospheric if the first stage 624 of compressor 622 is operating as a vacuum pump.

Heat must be supplied to the reactive adsorbers 3 in order to provide the endothermic heat of reaction. This heat of reaction is less than the endothermic requirement for conventional steam reforming processes, because the more endothermic reaction branch producing carbon monoxide is suppressed by carbon dioxide sorption in the present process. Furthermore, a substantial fraction (estimated to be about 25%) of the endothermic requirement during the higher pressure production step is provided by the exothermic heat of carbon dioxide sorption, while this heat of sorption must of course be provided to the adsorbers 3 during carbon dioxide desorption at lower pressures.

Some or all of the endothermic heat requirement may be provided as sensible heat provided to the incoming feed gas by heat exchangers 605 and 606, and to the incoming light reflux and purge gases by heat exchanger 311. Unlike the case of embodiment 300 of FIG. 6 where axial thermal conductivity in the adsorbers was desirably low to reduce heat leakage, in this embodiment a high axial thermal conductivity of the adsorbers is most desirable to improve heat transfer between the reaction zone in the adsorbers and external heat exchangers 605, 606 and 311. Furthermore, a high solid phase heat capacity is desirable within the reactive adsorbers 3 to provide some heat storage and reduce reaction temperature swings as the endothermic reaction rate will be highest during the higher pressure production step of the cycle. Use of a metallic foil or mesh support for the catalyst and sorbent in adsorbers 3 will provide the desired enhancements of axial thermal conductivity and solid phase heat capacity.

The heat demand of heat exchangers 605 and 311 may be made up by combustion of residual fuel components in the second product delivered by conduit 623. This fuel may be supplemented by methane either from the feedstock or else recovered as low pressure tail gas from downstream final purification of the product hydrogen delivered from conduit 611.

Some or all of the endothermic heat requirement may alternatively be provided within adsorbers 3 by admitting a fraction of oxygen or air to purge stream infeed conduit 615 so that partial catalytic combustion of fuel components (particularly unreacted methane) takes place during the purge step. This is an "autothermal reforming" process option. Direct combustion heat release during the purge step at the lower pressure will of course assist carbon dioxide desorption, while storing the remaining heat in the solid matrix of the adsorbers to provide endothermic heat of reaction during the next production step at the higher pressure.

Alternatively, heat may be provided by transverse heat transfer through extended heat exchange surfaces constituting the walls of adsorbers 3. Rotary module 2 is shown in FIG. 10, in the view corresponding to section 204–205 of FIG. 4, and in a simplified configuration suitable for heat exchange to the adsorbers within the rotor 2. As in view 200B of FIG. 5, the adsorbers 3 are depicted as rectangular flat packs of laminated flat sheets. In order to provide heat exchange surfaces, each adsorber is contained in a jacket 630 whose external surfaces contact heat exchange channels 631, in turn bounded by walls 632 and 633. Heat exchange in channels 631 may in general be achieved by any means, including radiant heating, sensible heat transfer from hot flue gas, latent heat transfer from condensing vapors, sensible heat transfer from liquid metals, etc. For heat transfer from a fluid, the direction of fluid flow may be either substantially parallel or transverse to the process flow direction within the adsorbers 3, or a combination thereof. Baffles may be used to reverse the direction of heat exchange fluid flow along the length or width of the adsorbers.

While FIG. 10 shows a single annular ring of adsorbers in rotor 2, more complicated arrays (e.g. including two or more annular rings of adsorbers) may be considered within the invention.

FIG. 11 shows a detailed cross section of a single adsorber 3 within its jacket 630. Adsorber 3 is a parallel pack of flat sheets 640, here supporting both the catalyst and the adsorbent in contact with the flow channels 641 defined by spacers 642 between each adjacent pair of sheets 640. The jacket 630 includes side walls 651 and 652 parallel to the sheets 640, and edge walls 653 and 654 terminating the edges of sheets 640. For good heat transfer with minimal transverse thermal gradients across the adsorber pack, it is desirable that there be intimate thermal contact and ample thermal conductance between the sheets 640 and the edge walls 653,654; and between the side walls 651,652, spacers and sheets.

The sheets 640 may in principle be comprised of any reinforcement material compatible with reacting gas species and with the operating temperatures, e.g. metal foil, metal mesh, woven or nonwoven fabrics of glass or mineral fibers, or mineral or glass fiber papers. For desired thermal properties of high thermal conductivity and high heat capacity, metal foils or wire cloth are highly preferred. A mixture of catalyst (e.g. nickel on alumina support) and the carbon dioxide sorbent may readily be coated on a metallic support to form sheet 640, either with inorganic binders or self-bound by the sorbent. Spacers 642 may be provided as narrow metal strips parallel to the flow direction in order to define channels 641, or alternatively may be formed by etching the channels through metal foil by photolithographic techniques. Jacket 630 may then be fabricated by diffusion bonding a stack of metal foils, which are alternatingly those coated with sorbent and catalyst, and those etched to form the longitudinal flow channels 641. The edges of metal foils from both the sorbent/catalyst coated sheets and the spacers are extended through the edge walls which will be formed by bonding the foils together with plates forming the side walls in fluid sealing contact.

It will be appreciated that the heat exchange reactor configuration of FIGS. 10 and 11 could be applied to exothermic as well as endothermic reactions.

While only preferred embodiments of the invention have been described herein in detail, the invention is not limited thereby and modifications can be made within the scope of the attached claims.

The embodiments of the invention in which an exclusive property or privilege is claimed are defined as follows:

1. A process for conducting an endothermic chemical reaction which has a gas phase reactant and a gas phase product, while performing separations by pressure swing adsorption of the product component from the reactant component over an adsorbent material on which one of the reactant and the product components is a more readily adsorbed component and the other is a less readily adsorbed component under increase of pressure, the process including the steps of:
   (a) introducing a feed gas containing the reactant component to a reaction space,
   (b) conducting the reaction within the reaction space so as to obtain a gas mixture containing the reactant and the product components
   (c) contacting the gas mixture containing the reactant and the product components with the adsorbent material in flow paths extending between first and second valve faces in a rotor,
   (d) supplying gas to the first or second valve face to achieve an upper pressure of the process,
   (e) withdrawing gas from the first or second valve face to achieve a lower pressure of the process,
   (f) rotating the rotor at a rotational speed so as to establish cyclic fluid communication for each of the flow paths through the first and the second valve faces in a cyclic sequence, so as to establish flow in each flow path directed from the first valve face to the second valve face at substantially the upper pressure, and to establish flow in each flow path directed from the second valve face to the first valve face at substantially the lower pressure; and
   (g) contacting a purge gas stream with the adsorbent material in the flow paths wherein the purge gas stream includes oxygen so as to provide heat in the flow paths by catalytic combustion of a reactant component.

2. The process of claim 1, in which the reactant component is the less readily adsorbed component, and withdrawing a product enriched in the more readily adsorbed component from adjacent the first valve face.

3. The process of claim 2, further withdrawing gas enriched in the more readily adsorbed component from the first valve face, compressing that gas to an increased pressure, and refluxing the gas to the first valve face and thence the flow paths at the increased pressure, so as to increase the concentration of the more readily adsorbed component adjacent the first valve face.

4. The process of claim 1, further maintaining the temperature of the flow path adjacent the first valve face approximately at a first temperature, and maintaining the temperature of the flow path adjacent the second valve face approximately at a second temperature.

5. The process of claim 1, maintaining the first temperature to be greater than the second temperature, and exchanging heat between the gas mixture in the flow paths and solid material with heat capacity disposed along the flow paths.

6. The process of claim 1, maintaining the second temperature to be greater than the first temperature, and exchanging heat between the gas mixture in the flow paths and solid material with heat capacity disposed along the flow paths.

7. The process of claim 1, further conducting the reaction within the flow paths, a portion of each of which being a reaction space.

8. The process of claim 1, further comprising the step of conducting heat between extended heat transfer surfaces in the rotor and the flow paths intermediately between the first and second valve faces.

9. The process of claim 1, further comprising the step of conducting heat to the flow paths from a heat transfer fluid externally contacting heat exchange surfaces in the rotor.

10. The process of claim 1, wherein the reactant component comprises a first component which is a hydrocarbon and a second component, comprising steam, and wherein the product component comprises a strongly adsorbed component, which is carbon dioxide, and a component, which is hydrogen, and wherein the adsorbent material is selective for carbon dioxide in the presence of steam at elevated temperature.

11. The process of claim 10 further comprising the step of providing a nickel catalyst in the flow paths.

12. The process of claim 10 further comprising the step of providing a platinum group catalyst in the flow paths.

13. The process of claim 10 in which the first and second reactant components are introduced to the first valve face at substantially the upper pressure while hydrogen is delivered from the second valve face, and carbon dioxide is delivered from the first valve face at substantially the lower pressure.

14. The process of claim 11 in which steam is admitted to the second valve face at substantially the lower pressure so as to assist purge.

15. The process of claim 10 in which air or oxygen is admitted to the second valve face at substantially the lower pressure so as to assist purge while providing heat to the flow paths for the endothermic reaction.

* * * * *